US011521123B2

(12) United States Patent
Choi et al.

(10) Patent No.: US 11,521,123 B2
(45) Date of Patent: Dec. 6, 2022

(54) CONTROLLER AND OPERATING METHOD THEREOF

(71) Applicant: SK hynix Inc., Gyeonggi-do (KR)

(72) Inventors: Kwang-Ho Choi, Seoul (KR); Won-Kyoo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 319 days.

(21) Appl. No.: 16/701,990

(22) Filed: Dec. 3, 2019

(65) Prior Publication Data

US 2020/0342355 A1 Oct. 29, 2020

(30) Foreign Application Priority Data

Apr. 25, 2019 (KR) .................. 10-2019-0048429

(51) Int. Cl.
*G06N 20/00* (2019.01)
*G06F 3/06* (2006.01)

(52) U.S. Cl.
CPC ............. *G06N 20/00* (2019.01); *G06F 3/061* (2013.01); *G06F 3/0659* (2013.01); *G06F 3/0679* (2013.01)

(58) Field of Classification Search
CPC ...... G06F 3/061; G06F 3/0659; G06F 3/0679; G06F 3/0653; G06F 3/0611;
(Continued)

(56) References Cited

U.S. PATENT DOCUMENTS 5,916,309 A * 6/1999 Brown .................... G06F 5/065
710/52
9,860,088 B1 * 1/2018 DeSimone ............... G11C 5/04
(Continued)

FOREIGN PATENT DOCUMENTS

KR 10-2014-0013893 2/2014
KR 10-2018-0104839 9/2018

OTHER PUBLICATIONS

J. Rosen, A. Andrei, P. Eles and Z. Peng, "Bus Access Optimization for Predictable Implementation of Real-Time Applications on Multiprocessor Systems-on-Chip," 28th IEEE International Real-Time Systems Symposium (RTSS 2007), 2007, pp. 49-60, doi: 10.1109/RTSS.2007.24. (Year: 2007).*

(Continued)

*Primary Examiner* — Kalpit Parikh
(74) *Attorney, Agent, or Firm* — IP & T Group LLP

(57) ABSTRACT

A controller includes: a host interface providing a host with reception ready signals corresponding to a threshold value in response to a program command; and a processor performing a training operation to determine an optimal value for the threshold value, wherein the processor includes: an outstanding ready-to-transfer (RTT) value selector selecting one value in a range from a minimum value to a maximum value as the threshold value; a time measurer providing the host with the reception ready signals that are selected corresponding to the threshold value and measuring a reception time of data corresponding to each of the selected reception ready signals; a normalizer normalizing the reception times to generate normalized times that are measured for values ranging from the minimum value to the maximum value; and an optimal outstanding RTT value determiner determining the threshold value corresponding to a minimum normalization time as the optimal value.

19 Claims, 11 Drawing Sheets

(58) Field of Classification Search
CPC .... G06F 3/0656; G06F 3/0658; G06F 3/0673; G06F 3/0604; G06N 20/00
See application file for complete search history.

(56) References Cited

U.S. PATENT DOCUMENTS

| | | | |
|---|---|---|---|
| 2013/0044553 A1* | 2/2013 | Kwean | G11C 29/023 365/194 |
| 2015/0032913 A1* | 1/2015 | Kim | G06F 13/4291 710/24 |
| 2017/0090804 A1* | 3/2017 | Bialas, Jr. | G06F 13/1694 |
| 2017/0093400 A1* | 3/2017 | Bains | G06F 3/0673 |
| 2018/0267724 A1* | 9/2018 | Jang | G06F 11/00 |
| 2019/0004984 A1* | 1/2019 | Lee | G06F 13/1657 |

OTHER PUBLICATIONS

Universal Flash Storage (UFS) Version 3.0, JEDEC Standard No. 220D, Jan. 2018, pp. 1-386, JEDEC Solid State Technology Association 2018, Arlington, VA.

* cited by examiner

CONTROLLER AND OPERATING METHOD THEREOF

CROSS-REFERENCE TO RELATED APPLICATION

The present application claims priority of Korean Patent Application No. 10-2019-0048429, filed on Apr. 25, 2019, which is incorporated herein by reference in its entirety.

BACKGROUND

1. Field

Various embodiments of the present invention relate to a controller, and more particularly, to a controller for efficiently performing a program operation, and a method for operating the controller.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSDs).

SUMMARY

Embodiments of the present invention are directed to a controller capable of detecting an optimal outstanding ready-to-transfer (RTT) value through a training operation.

In accordance with an embodiment of the present invention, a controller includes: a host interface suitable for providing a host with reception ready signals corresponding to a threshold value in response to a program command provided from the host; and a processor suitable for performing a training operation to determine an optimal value for the threshold value, wherein the processor includes: an outstanding ready-to-transfer (RTT) value selector suitable for selecting one value in a range from a minimum value to a maximum value as the threshold value; a time measurer suitable for providing the host with the reception ready signals that are selected corresponding to the threshold value and measuring a reception time of data corresponding to each of the selected reception ready signals; a normalizer suitable for normalizing the reception times to generate normalized times that are measured for values ranging from the minimum value to the maximum value; and an optimal outstanding RTT value determiner suitable for determining the threshold value corresponding to a minimum normalization time among the normalized times as the optimal value.

In accordance with another embodiment of the present invention, a method for operating a controller includes: outputting reception ready signals corresponding to a threshold old value in response to a program command provided from a host; and performing a training operation to determine an optimal value for the threshold value, wherein the performing of the training operation includes: selecting one value in a range from a minimum value to a maximum value as the threshold value; measuring a reception time of data corresponding to each of the reception ready signals; normalizing the reception times to generate normalization times that are measured for values ranging from the minimum value to the maximum value; and determining the threshold value corresponding to a minimum normalization time among the normalization times as the optimal value.

In accordance with yet another embodiment of the present invention, a method for operating a data processing system adopting a Universal Flash Storage (UFS) interface includes: receiving a maximum outstanding ready-to-transfer (RTT) value from a source; performing a training operation for performing a data transaction operation to select one value among values ranging from a minimum outstanding RTT value to the maximum outstanding RTT value as an optimal outstanding RTT value; and performing a subsequent data transaction operation based on the selected optimal outstanding RTT value.

In accordance with yet another embodiment of the present invention, a data processing system includes: a memory system including a controller and a memory device; and a host suitable for providing the controller with write data for storing in the memory device, wherein the controller: performs a training operation on multiple cases, each having a different number of ready-to-transfer (RTT) signals, the training operation including measuring a reception time with respect to write data for each case, and selecting the case having the lowest reception time; and transmits, to the host, reception ready signals corresponding to the selected case, each of the reception ready signals in the selected case requesting some of the write data.

DETAILED DESCRIPTION

Figure 1:
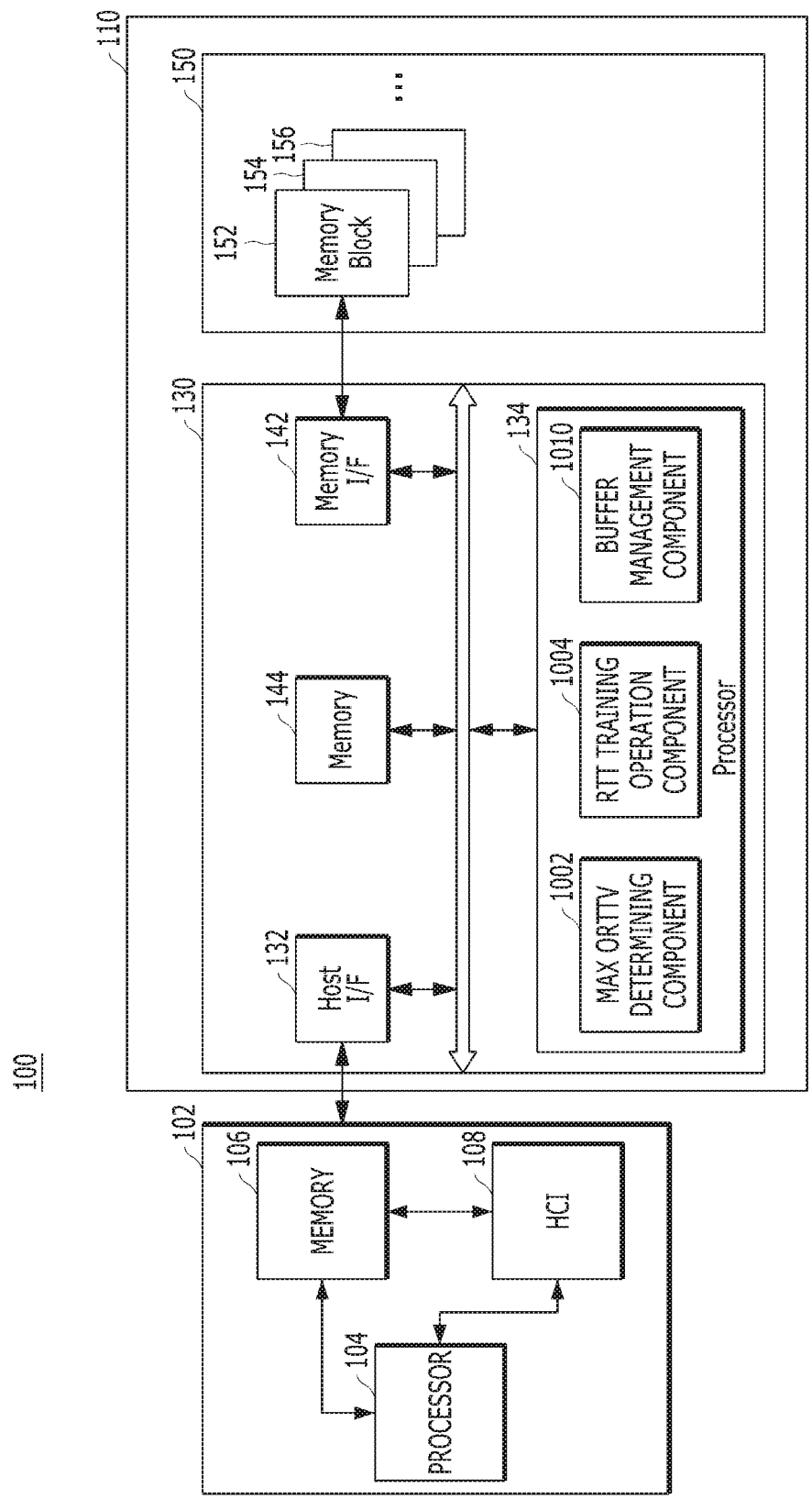
FIG. 1 is a block diagram illustrating a data processing system including a memory system in accordance with an embodiment of the present invention.

Various embodiments of the present invention are described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first" and/or "second" may be used herein to identify various elements, these elements should not be limited by these terms. These terms are only used to distinguish one element from another element. A first element in one instance could be termed a second element in another instance without implying any substantive change to the element itself.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that open-ended terms, such as "comprise", "include", "have", etc. when used in this specification, specify the presence of stated features, numbers, steps, operations, elements, components, and/or combinations thereof but do not preclude the presence or addition of one or more other features, numbers, steps, operations, elements, components, and/or combinations thereof.

The disclosed embodiments are merely for the purpose of understanding the technical spirit of the present invention, not to limit it. Those skilled in the art to which the present disclosure pertains will understand in light of the present disclosure that various modifications may be made to any of the disclosed embodiments.

Unless otherwise defined, all terms including technical and scientific terms used herein have the same meaning as commonly understood by one of ordinary skill in the art to which the present disclosure pertains. Unless otherwise defined in the present disclosure, the terms should not be construed in an ideal or excessively formal way.

Various embodiments of the present invention are described in detail below with reference to the accompanying drawings.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player and a laptop computer, or a variety of non-portable electronic devices such as a desktop computer, a game machine, a television (TV) and a projector. The host 102 may include a processor 104, a memory 106 and a host controller interface (HCI) 108.

The processor 104 may include at least one operating system (OS) and may execute the operating system(s) to perform an operation with the memory system 110 according to a user request. The processor 104 may generate a plurality of commands corresponding to the user request. The memory system 110 may perform operations corresponding to the commands, i.e., operations corresponding to the user request. The operating system(s) may generally manage and control the function and operation of the host 102 and provide operations between the host 102 and a user using the data processing system 100 or the memory system 110.

The memory 106 may store data for driving the host 102 and the memory system 110. The memory 106 may store the plurality of commands and may include a data buffer. The data buffer may store data to be provided to the memory system 110 and data provided from the memory system 110.

Host controller interface 108 may control memory system 110 to perform the operations corresponding to the user request by transferring the plurality of commands to the memory system 110. As described below, the host controller interface 108 may receive a ready-to-transfer (RTT) signal provided from the memory system 110. The RTT signal may include size information and buffer offset information of data to be received. Host controller interface 108 may transfer data stored in the memory 106 in response to the RTT signal and may receive command response signal RESPONSE provided from the memory system 110.

The memory system 110 may operate or perform a specific function or operation in response to a request from the host 102. Particularly, the memory system 110 may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include any of various types of storage devices. Non-limiting examples of such storage devices include volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a controller 130 and a memory device 150.

The controller 130 and the memory device 150 may be integrated into a single semiconductor device, which may be included in any of the various types of memory systems as described above. For example, the controller 130 and the memory device 150 may be integrated as a single semiconductor device to constitute a solid state drive (SSD), a personal computer memory card international association (PCMCIA) card, a secure digital (SD) card including a mini-SD, a micro-SD and a SDHC, and a universal flash storage (UFS) device. The memory system 110 may be configured as a part of a computer, a smart phone, a portable game player, or one of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, a memory interface (I/F) 142, and a memory 144, all operatively coupled or engaged via an internal bus. The processor 134 may include a maximum outstanding RTT value (ORTTV) determining component 1002, an RTT training operation component 1004, and a buffer management component 1010. The components of the processor 134 are described below with reference to FIG. 10. Generally, each such component may be implemented in hardware, e.g., suitable circuitry, sub-processor or the like, or as a combination of hardware and software/firmware.

The host interface 132 may process a command and data of the host 102. The host interface 132 may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE). The host interface 132 may be driven via firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. In an embodiment, as shown in FIG. 1, the memory 144 may be disposed within the controller 130. In another embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor and/or a central processing unit (CPU).

For example, the controller 130 may perform an operation requested by the host 102 in the memory device 150 through the processor 134. Also, the controller 130 may perform a background operation on the memory device 150 through the processor 134. The background operation may include copying data stored in one or more memory blocks among the memory blocks 152 to 156 and storing such data in one or more other memory blocks, e.g., a garbage collection (GC) operation, swapping data between select memory blocks of the memory blocks 152 to 156, e.g., a wear-leveling (WL) operation, storing the map data stored in the controller 130 in the memory blocks 152 to 156, e.g., a map flush operation, and/or managing bad blocks of the memory device 150, e.g., a bad block management operation of detecting and processing bad blocks among the memory blocks 152 to 156 in the memory device 150.

In storing data in the memory device 150, the host 102 may provide the controller 130 with a program command, a logical address, and data to be stored. After writing the data in the memory 144, when the size of the data is that of a unit that may be programmed by the memory device 150 (for example, a unit of a page or one shot), the controller 130 may control the memory device 150 to program the data in an open block. When the size of the data provided from the host 102 is larger than the remaining space of the memory 144, the controller 130 may not write the data in the memory 144 in response to the program command, because the storage space of the memory 144 is limited.

In the case of a universal ash storage (UFS) device, the host 102 and the memory system 110 may correspond to a master MASTER and a slave SLAVE, respectively. When a master issues a program command, a slave may detect the remaining space of the slave. When the capacity for storing the data for the program command is acquired, the slave may provide the master with a ready-to-transfer (RTT) signal. When the slave is ready to receive data from the master, the RTT signal may be a ready completion signal that is provided from the slave to the MASTER. The master may provide the slave with the data for the program command in response to the RTT signal. The master may output the data for the program command only when the slave provides the RTT signal. Therefore, the slave may receive all the output data only after a storage space of a sufficient size is secured.

Figure 2:
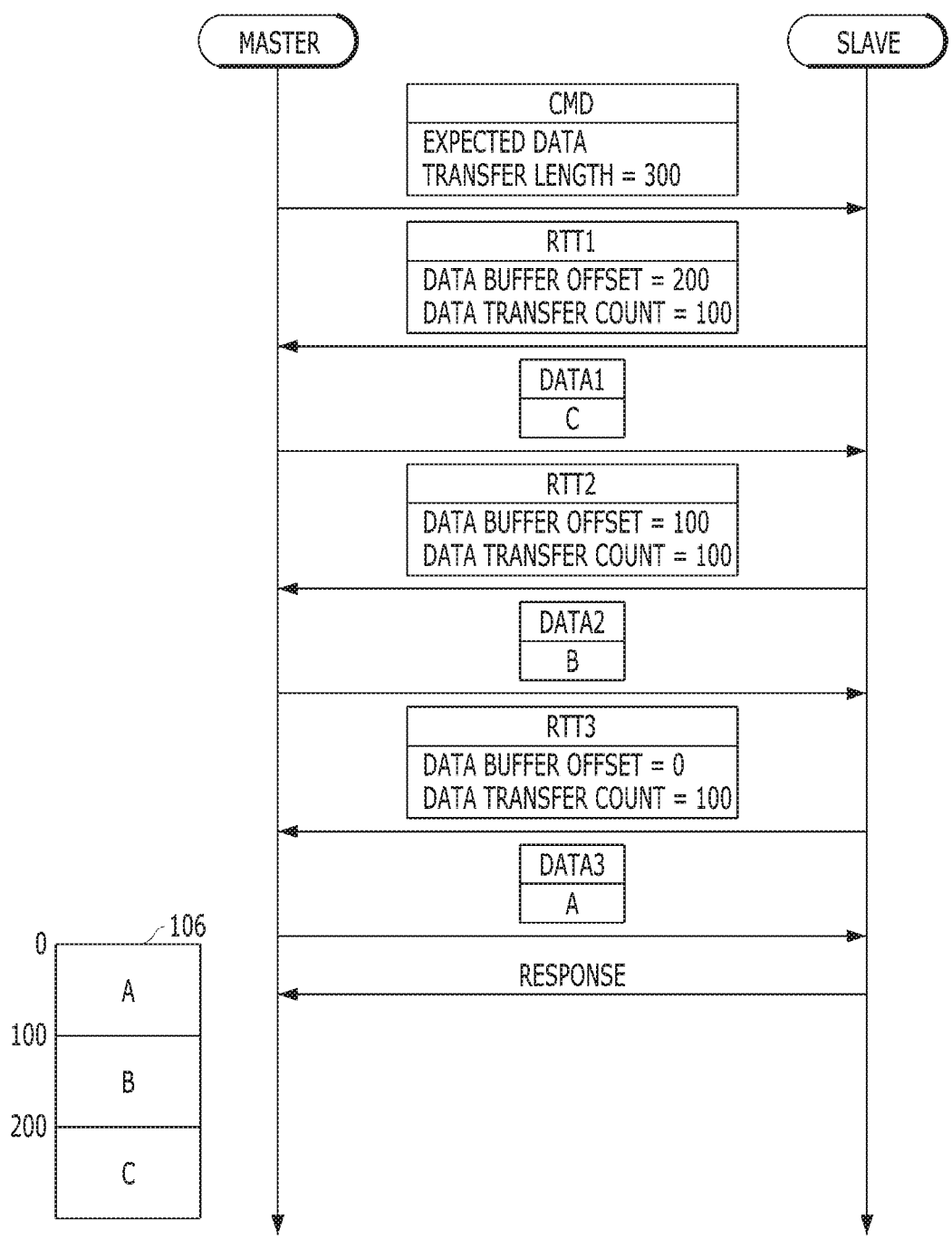
FIG. 2 illustrates transaction between a master and a slave in a data processing system in accordance with an embodiment of the present invention.

FIG. 2 illustrates transaction between a master MASTER and a slave SLAVE in a data processing system in accordance with an embodiment of the present invention.

Referring to FIG. 2, the master may provide the slave with a program command CMD and information on the size of program data (i.e., program data size information), which represents expected data transfer length. For example, the size of the program data may be '300'. The slave may compare the size of the program data with the size of the remaining storage space of the slave in response to the program command CMD. When the size of the remaining storage space of the slave is greater than or equal to the size of the program data, the slave may provide the master with an RTT signal. For example, when the remaining storage space of the slave is greater than or equal to '300', which is the size of the program data, the slave may output an RTT signal.

The RTT signal may include information on a size of requested data (i.e., requested data size information) DATA TRANSFER COUNT and buffer offset information DATA BUFFER OFFSET. The master may provide the slave with the program data stored in a memory 106 in response to the RTT signal. The buffer offset information DATA BUFFER OFFSET may include information on the offset of the memory 106 that represents the location where some data requested by the slave among the program data provided by the master to the slave is stored. The requested data size information DATA TRANSFER COUNT may include information on the size of data requested by the slave. The master may provide the slave with data based on the requested data size information DATA TRANSFER COUNT and the buffer offset information DATA BUFFER OFFSET. The data may include a header and a tail. The header of the data is located in the offset of the memory 106. A size of the data corresponds to the size of the data requested by the slave.

The memory 106 may include three portions A, B and C, and the offsets thereof may be '0, 100, and 200', respectively. The data storage size of each of the portions may be '100'. The slave may provide the master with a first RTT signal RTT1 that includes buffer offset information DATA BUFFER OFFSET for the offset of '200' and the requested data size information DATA TRANSFER COUNT for the data size of '100'. The master may provide the slave with the first data DATA1 corresponding to the third portion C in response to the first RTT signal.

The slave may provide the master with a second RTT signal RTT2 after receiving the first data DATA1. The second RTT signal may include buffer offset information DATA BUFFER OFFSET for an offset of '100' and requested data size information DATA TRANSFER COUNT for a data size of '100'. The master may provide the slave with the second data DATA2 corresponding to the second portion B in response to the second RTT signal. Similarly, the slave may provide the master with a third RTT signal RTT3 after receiving the second data DATA2, and the master may provide the slave with a data responding to the first potion A in response to the third RTT signal.

When the slave receives data satisfying the offset and data size requested according to the RTT signal and receives all the program data for the program command CMD, the slave may provide the master with a response signal RESPONSE. When the slave receives data that does not satisfy the offset and data size requested according to the RTT signal, the slave may provide the master with a response including an error flag MISMATCH ERROR FLAG.

Figure 3:
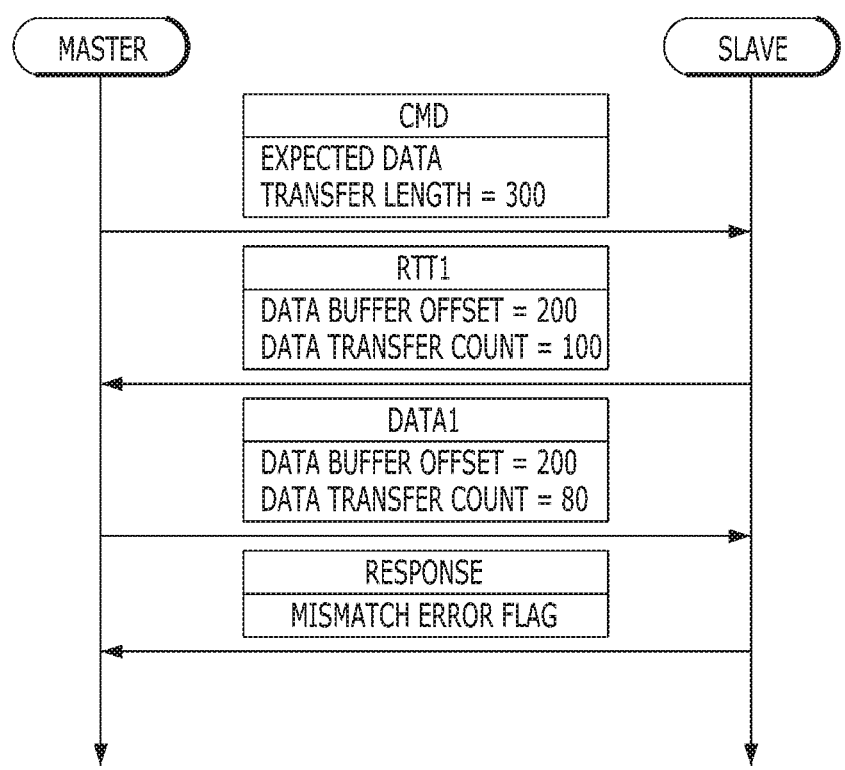
FIG. 3 illustrates a case where requested information of a ready-to-transfer (RTT) signal and data information provided in response to the RTT signal are inconsistent.

FIG. 3 illustrates a case where requested information of a ready-to-transfer (RTT) signal and data information provided in response to the RTT signal are inconsistent.

Referring to FIG. 3, the master may provide the slave with the program command CMD and information on the size of the program data EXPECTED DATA TRANSFER LENGTH. The size of the program data may be '300'. The slave may provide the master with a first RTT signal when the remaining space is greater than or equal to 300. The first RTT signal may include buffer offset information DATA BUFFER OFFSET and on requested data size information DATA TRANSFER COUNT. The offset of the buffer offset information DATA BUFFER OFFSET and the data size of the requested data size information DATA TRANSFER COUNT may have values of '200' and '100', respectively.

The master may provide the slave with the program data in response to the first RTT signal RTT1. The master may provide the slave with the program data stored in the memory 106 based on the buffer offset information and the requested data size information DATA TRANSFER COUNT that are included in the first RTT signal RTT1. The master may provide the slave with data whose header is located in the offset of '200' and whose data size has a value of '100' from the memory 106. When an error occurs and either the offset or the data size of the data received by the slave is inconsistent with the buffer offset information DATA BUFFER OFFSET and the requested data size information DATA TRANSFER COUNT included in the first RTT signal, the slave may provide the master with an error flag MISMATCH ERROR FLAG along with a response signal RESPONSE. For example, when the master provides the slave with program data whose offset has a value of '200' and whose data size has a value of '80' in response to the first RTT signal, the slave may provide the master with an error flag MISMATCH ERROR FLAG along with a response signal RESPONSE.

In the case of the transaction described above with reference to FIG. 2, the slave may receive program data corresponding to one RTT signal and provide the master with a subsequent RTT signal only after receiving the program data corresponding to one RTT signal. The slave may provide the master with a plurality of RTT signals even before receiving the program data for one RTT signal. The number of RTT signals that may be provided to the master until the program data for one RTT signal is received may be defined as an outstanding RTT. FIGS. 2 and 3 described above may show a case where the outstanding RTT is '1'.

Figure 4:
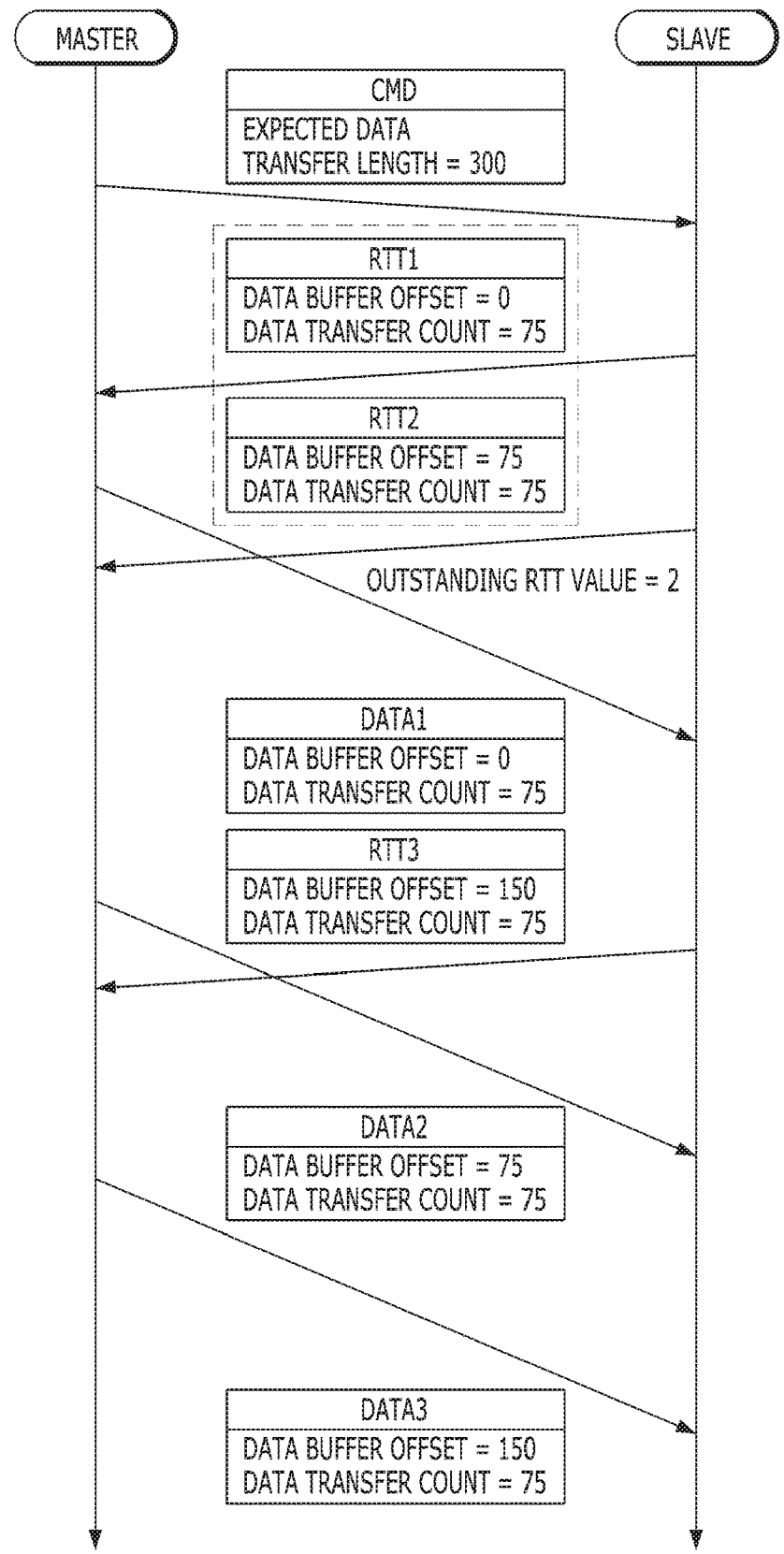
FIGS. 4 and 5 illustrate the concept of outstanding RTT.
Figure 5:
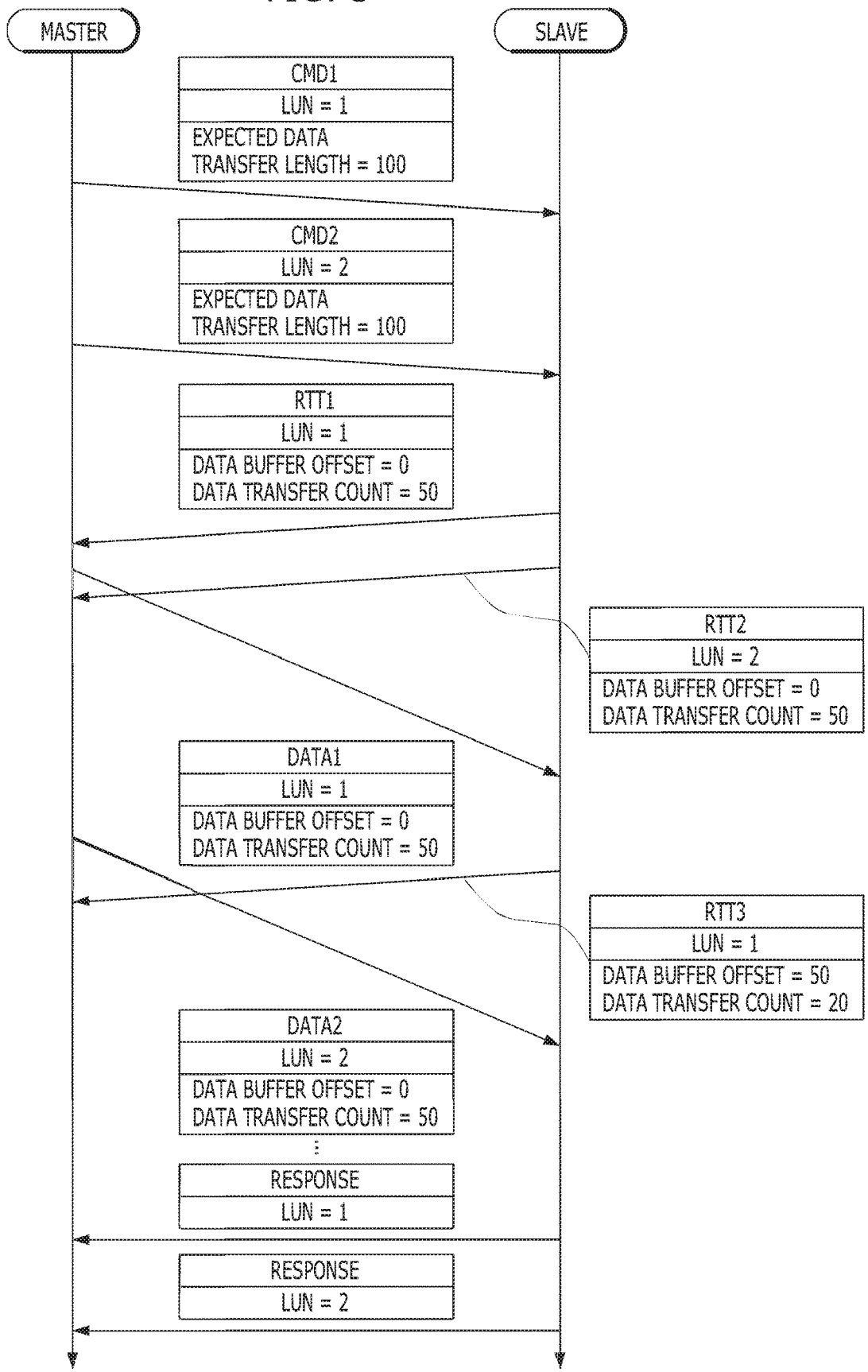

FIGS. 4 and 5 illustrate the concept of outstanding RTT.

By way of example, FIG. 4 illustrates a transaction between the master and the slave in which the outstanding RTT is '2'. However, the transaction operation may be performed in the same manner even when the outstanding RTT is greater than '2'.

The master may provide the slave with the program command CMD and the information on the size of the program data EXPECTED DATA TRANSFER LENGTH. For example, the size of the program data may be '300'. The slave may compare the size of the program data with the size of the remaining storage space of the slave in response to the program command CMD. When the size of the remaining storage space of the slave is greater than or equal to the size of the program data, the slave may provide the master with an RTT signal.

Since the value of the outstanding RTT OUTSTANDING RTT VALUE is '2', the slave may provide the master with a first RTT signal RTT1 and a second RTT signal. The slave may provide the master with a first RTT signal that includes the buffer offset information DATA BUFFER OFFSET for the offset of '0' and the requested data size information DATA TRANSFER COUNT for the data size of '75'. The slave may provide the master with a second RTT signal that includes the buffer offset information DATA BUFFER OFFSET for the offset of '75' and the requested data size information DATA TRANSFER COUNT for the data size of '75'.

The master may provide the slave with first data DATA1 in response to the first RTT signal. The master may provide the slave with data whose header is located in an offset of '0' and whose data size IS '75' from the memory 106. Since there is only one data transfer bus between the master and the slave, the master may provide the slave with the second data DATA2 only after the first data DATA1 is provided.

The master may provide the slave with the second data DATA2 in response to the second RTT signal. The master may provide the slave with data whose header is located at the offset of '75' and whose data size has a value of '75' from the memory 106. The slave may provide the master with a third RTT signal while receiving the second data DATA2. When the outstanding RTT value is '2' and the slave receives all the first data DATA1, the pending RTT signal is only the second RTT signal. Therefore, the slave may provide the master with the third RTT signal in such a manner that the number of the pending RTT signals satisfies the value of the outstanding RTT.

The slave may provide the master with the third RTT signal that includes the buffer offset information DATA BUFFER OFFSET for the offset of '150' and the requested data size information DATA TRANSFER COUNT for the data size of '75'. When the slave receives all the second data DATA2, the master may provide the slave with third data DATA3. The master may provide the slave with data whose header is located at the offset of '150' and whose data size is '75' from the memory 106.

FIG. 5 illustrates a transaction between the master and the slave when there are a plurality of program commands provided from the master and the outstanding RTT is greater than '1'.

Referring to FIG. 5, the master may provide the slave with a plurality of program commands. By way of example, a case where the number of the program commands is '2' is described below. The master may provide the slave with a first program command CMD1 and a second program command CMD2. The master may provide the slave with a logical unit number LUN and program data size information EXPECTED DATA TRANSFER LENGTH along with the program commands. The logical unit number LUN may be information for identifying each of a plurality of commands.

The master may provide the slave with a logical unit number LUN of '1' and information on the size of a program data EXPECTED DATA TRANSFER LENGTH on the size of a program data of '100' together with a first command CMD1. Also, the master may provide the slave with a logical unit number LUN of '2' and information on the size of a program data EXPECTED DATA TRANSFER LENGTH on the size of a program data of '100' together with a second command CMD2. The slave may compare the size of the remaining storage space of the slave with the sum of the sizes of the program data corresponding to the first and second commands CMD1 and CMD2 in response to the first and second program commands CMD1 and CMD2. When the size of the remaining storage space of the slave is greater than or equal to '200', which is the sum of the size of the program data corresponding to the first program command CMD1, which is '100', and the size of the program data corresponding to the second program command CMD2, which is '100'.

By way of example, a case where the value of the outstanding RTT is '2' is described. However, the transaction operation may be performed in the same manner even when the outstanding RTT is more than '2'. Since the outstanding RTT is '2', the slave may provide the master with the first and second RTT signals. The slave may provide the master with a first RTT signal that includes a logical unit number LUN of '1', buffer offset information DATA BUFFER OFFSET for an offset of '0', and requested data size information DATA TRANSFER COUNT for a data size of '50'. The slave may provide the master with a second RTT signal that includes a logical unit number LUN of '2', buffer offset information DATA BUFFER OFFSET for an offset of '0', and requested data size information DATA TRANSFER COUNT for a data size of '50'.

The master may provide the slave with first data DATA1 in response to the first RTT signal RTT1. The master may provide the slave with data having a logical unit number LUN of '1', having a header located in an offset of '0', and having a data size of '50'. As described above, since there is only one data transfer bus between the master and the slave, the master may provide the slave with second data DATA2 after providing the first data DATA1.

The master may provide the slave with the second data DATA2 in response to the second RTT signal. The master may provide the slave with data having a logical unit number LUN of '2', having a header located in an offset of '0', and having a data size of '50'. The slave may provide the master with a third RTT signal while receiving the second data DATA2. When the value of the outstanding RTT is '2' and the slave receives all of the first data DATA1, the pending RTT signal may be only the second RTT signal. Therefore, the slave may provide the master with a third RTT signal in such a manner that the number of the pending RTT signals satisfies the value of the outstanding RTT.

The slave may provide the master with a third RTT signal that includes buffer offset information DATA BUFFER OFFSET for an offset of '50' and requested data size information DATA TRANSFER COUNT for a data size of '20'. The master and the slave may repeatedly perform the above-described transaction operation until the program data for the first and second program commands CMD1 and CMD2 are provided to the slave. Upon receiving all the program data for the first program command CMD1, the slave may provide the master with a response signal RESPONSE that includes a logical unit number LUN of '1'. Upon receiving all the program data for the second program command CMD2, the slave may provide the master with a response signal RESPONSE that includes a logical unit number LUN of '2'.

Figure 6:
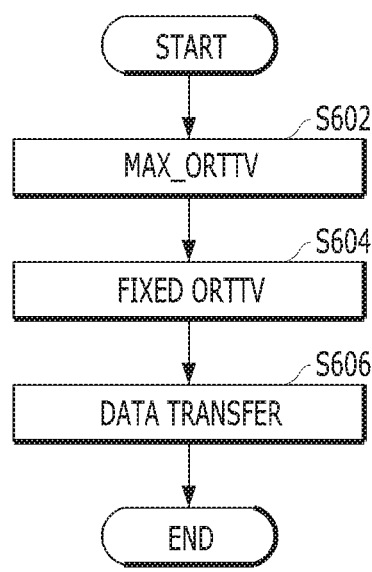
FIG. 6 is a flowchart illustrating a conventional operation of a data processing system.

FIG. 6 is a flowchart illustrating a conventional operation of a data processing system.

Referring to FIG. 6, in step S602, the slave may set the maximum outstanding RTT value MAX_ORTTV. The slave may provide the master with information on a first maximum outstanding RTT value, which is the maximum outstanding RTT value that may be set based on the slave. The master may provide the slave with information on a second maximum outstanding RTT value, which is the maximum outstanding RTT value that may be set based on the master. The first maximum outstanding RTT value may be greater than or equal to a second maximum outstanding RTT value. The slave may set the maximum outstanding RTT value based on the provided second maximum outstanding RTT value. The slave may set a smaller value among the first and second maximum outstanding RTT values as the maximum outstanding RTT value. Since the second maximum outstanding RTT value is less than or equal to the first maximum outstanding RTT value, the slave may set the second maximum outstanding RTT value as the maximum outstanding RTT value.

In step S604, the slave may fix the outstanding RTT to one value (FIXED ORTTV) in a range from the minimum outstanding RTT value to the maximum outstanding RTT value which is set in the step S602. The minimum outstanding RTT value may be '1' or '2'. For example, when the minimum outstanding RTT value is '2' and the maximum outstanding RTT value is '16', the slave may set the outstanding RTT value to any value from '2' to '12'.

In step S606, the master and the slave may perform the transaction operation described with reference to FIGS. 2 to 5 based on the fixed outstanding RTT value in the step S604. In other words, the slave may output an RTT signal in response to a program command provided by the master to the slave. Further, the master may provide (or transfer) to the slave program data in response to the RTT signal.

According to the conventional operation of FIG. 6, the slave may perform a transaction operation for an RTT signal and data based on the outstanding RTT value which is fixed to one value in the range from a minimum outstanding RTT value to the maximum outstanding RTT value. Depending on the performance of each of the master and the slave, the optimal outstanding RTT value for performing a transaction operation most quickly may be different. An outstanding RTT value initially fixed may not be the optimal outstanding RTT value. In order to detect the optimal outstanding RTT value, training is required to actually perform a transaction operation between the master and the slave while changing the outstanding RTT value. According to the operation of FIG. 6, since a training operation is not performed, the fixed ORTTV may not be the optimal outstanding RTT value.

According to an embodiment of the present invention, the master and the slave may directly perform a training operation while changing the outstanding RTT value. The slave may detect an outstanding RTT value corresponding to the least amount of time required to perform the transaction operation according to the training operation as the optimal outstanding RTT value and then perform a transaction operation with the master by setting the optimal outstanding RTT value as an outstanding RTT value. Therefore, even when the master is changed, the slave may perform a data transaction operation quickly by detecting the optimal outstanding RTT value through the training operation.

Figure 7:
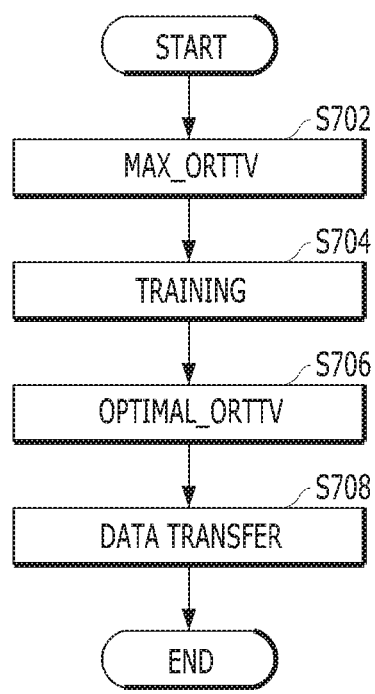
FIG. 7 is a flowchart illustrating an operation of a data processing system in accordance with an embodiment of the present invention.

FIG. 7 is a flowchart illustrating an operation of a data processing system in accordance with an embodiment of the present invention.

Referring to FIG. 7, in step S702, the slave may set the maximum outstanding RTT value. The slave may provide the master with information on the first maximum outstanding RTT value, which is the maximum outstanding RTT value that may be set based on the slave. The master may provide the slave with information on the second maximum outstanding RTT value, which is the maximum outstanding RTT value that may be set based on the master. The first maximum outstanding RTT value may be greater than or equal to the second maximum outstanding RTT value. The slave may set the second maximum outstanding RTT value as the maximum outstanding RTT value.

In step S704, the master and the slave may perform a training operation to detect an optimal outstanding RTT value. The slave may perform a transaction operation with the master while sequentially changing the outstanding RTT value in the range from a minimum outstanding RTT value to the maximum outstanding RTT value, which is set in the step S702. The minimum outstanding RTT value is described in connection with FIG. 8 below.

Figure 8:
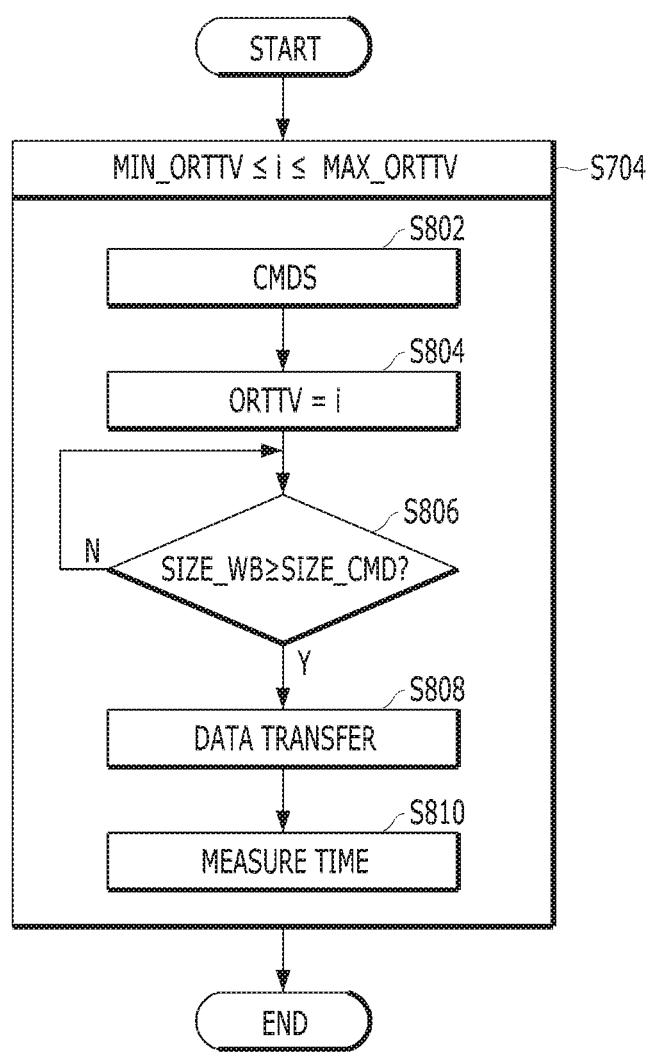
FIG. 8 is a flowchart illustrating a training operation in detail.

FIG. 8 is a flowchart illustrating a training operation in detail.

Referring to FIG. 8, step S704 may include steps S02 to S810 which may be repeated based on the outstanding RTT value.

In step S802, the master may provide the slave with a program command CMD, which may be a plurality of program commands CMDS. As described above with reference to FIGS. 2 to 4, the program command CMD may include information on the size of a program data and a logical unit number.

In step S804, the outstanding RTT value (i) may be set to the minimum outstanding RTT value MIN_ORTTV. The minimum outstanding RTT value may be '1' or '2'. According to an embodiment of the present invention, the slave may detect an outstanding RTT value requiring the least amount of time to perform a transaction operation by performing a training operation while sequentially changing the outstanding RTT value in the range from the minimum outstanding RTT value MIN_ORTTV to the maximum outstanding RTT value MAX_ORTTV. The specifics of setting the outstanding RTT value (i) may vary. For example, in the training operation, the outstanding RTT value may be sequentially changed in descending order, i.e., from the maximum outstanding RTT value to the minimum outstanding RTT value, instead of in ascending order.

In step S806, the slave may compare the size SIZE_WB of the memory 144 with the size SIZE_CMD of the program data, which is included in the program command provided in the step S802. When the size SIZE_WB of the memory 144 is less than the size SIZE_CMD of the program data, which is included in the program command ('N' in the step S806), the slave may not perform the subsequent operation until sufficient space of the memory 144 is secured.

When the size SIZE_WB of the memory 144 is greater than or equal to the size SIZE_CMD of the program data which is included in the program command ('Y' in the step S806), the master and the slave may perform a transaction operation in step S808. In other words, as described above with reference to FIGS. 2 to 5, the slave may provide the master with an RTT signal corresponding to the outstanding RTT value which is set in the step S804. Further, the master may output (or transfer) the program data in response to the RTT signal.

In step S810, the slave may measure the time required for the transaction operation which is performed in the step S808. As described below with reference to FIG. 9, since the size of the program data outputted in response to the RTT signal may differ for each RTT signal, the slave may normalize the time required for each RTT signal. Also, since the number of RTT signals provided to the master may be different according to the outstanding RTT value, the slave may obtain the average value of the normalized RTT signals. The slave may use the average value calculated based on the outstanding RTT value as the time required for the transaction operation MEASURE TIME.

Figure 9:
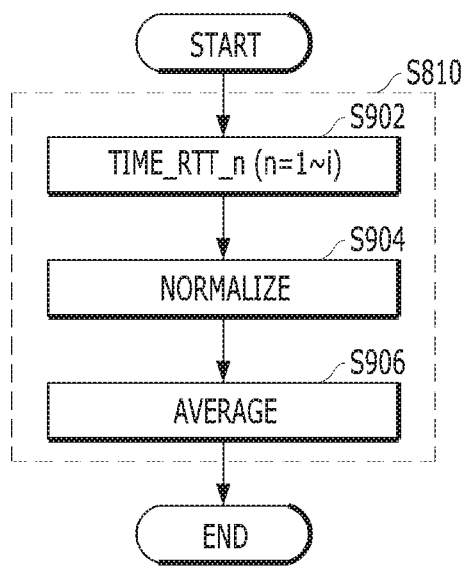
FIG. 9 is a flowchart illustrating a method for measuring the time required for a transaction operation in detail.

FIG. 9 is a flowchart illustrating a method for measuring the time required for a transaction operation in detail.

Referring to FIG. 9, step S810 may include steps S902 to S906.

In step S902, the slave may calculate the time TIMER_RTT_n (where n=1~i) from when the corresponding RTT signal is provided to the master to when the slave receives program data for that RTT signal. The RTT signals for which this time is calculated is set in step 804. For example, when the outstanding RTT value (i) is '2', the slave may calculate the time TIME_RTT_1 from when a first RTT signal is outputted to when the slave receives first data corresponding to the first RTT signal, and the slave may calculate the time TIME_RTT_2 from when a second RTT signal is outputted to when the slave receives second data corresponding to the second RTT signal.

In step S904, the slave may normalize the time TIME_RTT_n required to receive the program data for each of the RTT signals. Since the size of the requested data included in each of the RTT signals may be different, the size of the data provided from the master may be different as well. Therefore, in order to calculate the time required to transfer data of the same size, the slave may normalize the required time as shown in the following Equation 1.

$$TIME\_NORMALIZE\_n = TIME\_RTT\_n \times \frac{SIZE\_NORMALIZE}{DTC\_n}$$

The slave may calculate a normalized required time TIME_NORMALIZE_n by multiplying the time TIME_RTT_n by a value, which is calculated by dividing the size SIZE_NORMALIZE to be normalized by the requested data size DTC_n. The time TIME_RTT_n may be the time required to receive the program data for the RTT signal, measured from when the RTT signal is supplied to the master. The requested data size DTC_n of the requested data may be included in the RTT signal. For example, when the requested data size DTC_n is approximately 16 KB and the size SIZE_NORMALIZE to be normalized is approximately 4 KB, the slave may calculate the normalized required time TIME_NORMALIZE_n by dividing the measured time TIME_RTT_n by 16 and multiplying the obtained value by 4.

In step S906, the slave may obtain an average value of the normalized required times TIME_NORMALIZE_n obtained in the step S904. The slave may obtain the average value by dividing the sum of the normalized required times TIME_NORMALIZE_n by the outstanding RTT value ORTTV as shown in the following Equation 2. Since the number of program data outputted from the master may differ depending on the outstanding RTT value ORTTV, the time required until the slave receives the program data corresponding to a unit RTT signal may be calculated by obtaining the average value.

$$TIME\_AVERAGE = \frac{\sum_{n=1}^{i} TIME_{NORMALIZE_n}}{i}, (i = ORTTV)$$

The slave may calculate the average value TIME_AVERAGE by dividing the sum of the normalized required times by the outstanding RTT value ORTTV. For example, when the outstanding RTT value ORTTV is 2, the slave may calculate the average value TIME_AVERAGE by dividing the sum of a normalized first required time and a normalized second required time by the outstanding RTT value ORTTV, which is '2'. The normalized first required time is obtained by normalizing the time from when the first RTT signal is outputted to when the first data is received, and the normalized second required time is obtained by normalizing the time from when the second RTT signal is outputted to when the second data is received.

Referring back to FIG. 7, in step S706, the slave may detect an outstanding RTT value corresponding to a minimum value, among the times required for a transaction operation performed based on the different outstanding RTT values, as an optimal outstanding RTT value OPTIMAL_ORTTV. To be specific, the slave may compare the average values, each of which is calculated for each of the different outstanding RTT values as described in connection with step S906, and detect the outstanding RTT value having the minimum value as the optimal outstanding RTT value OPTIMAL_ORTTV.

In step S708, the master and the slave may perform a transaction operation based on the optimal outstanding RTT value OPTIMAL__ORTTV which is detected in the step S706. According to an embodiment of the present invention, the master and the slave may detect an optimal outstanding RTT value which may be changed according to the performance of the master and the slave by performing a training operation of performing an actual transaction operation by changing an outstanding RTT value. As a transaction operation is performed based on the optimal outstanding RTT value, the slave may improve the speed of a program operation.

According to an embodiment of the present invention, the slave may perform the above-described training operation in the initial stage right after fabrication of the flash memory. In addition, the slave may periodically perform the training operation during the operational life of the flash memory. The slave may detect the optimal outstanding RTT value by dynamically performing the training operation, thereby taking into account changes in the performances of master and the slave as time passes.

Figure 10:
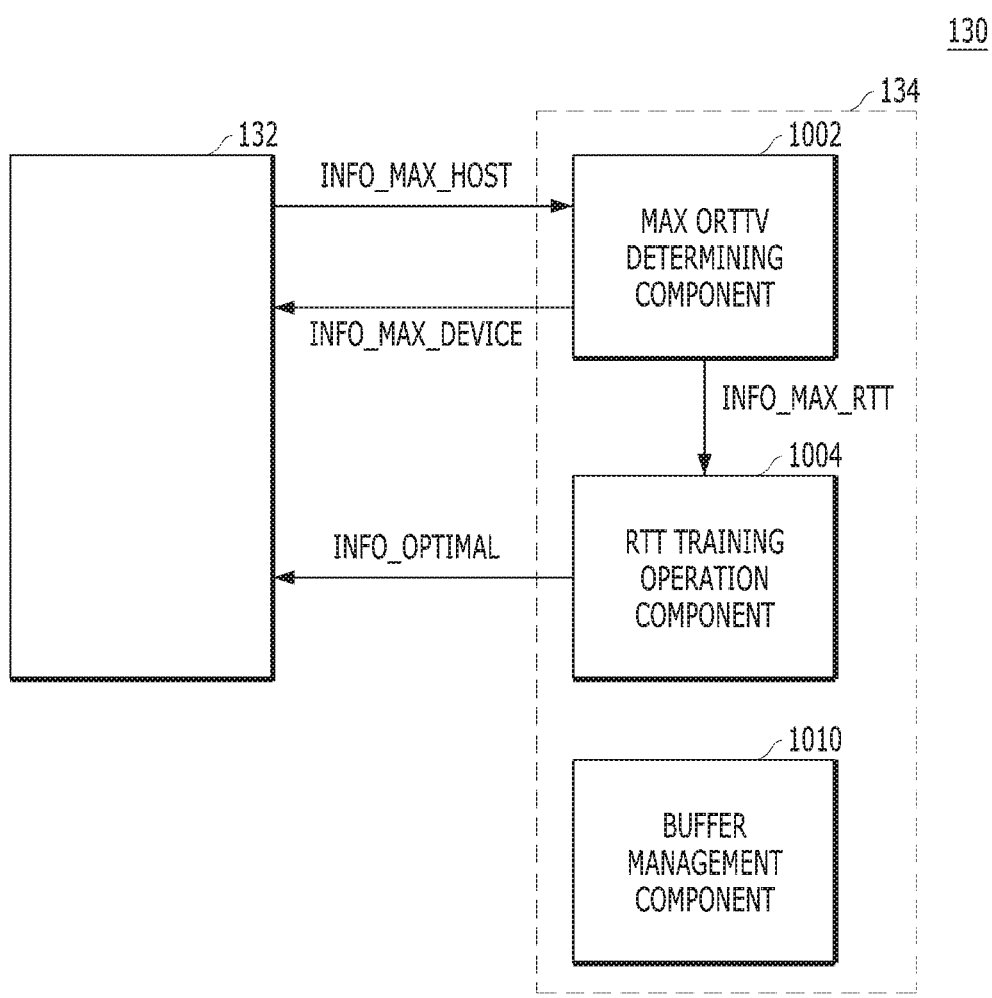
FIG. 10 illustrates a memory system in accordance with an embodiment of the present invention.

FIG. 10 illustrates a memory system 110 in accordance with an embodiment of the present invention.

FIG. 10 schematically shows only select elements of the data processing system 100 which are relevant to the description below. However, it is to be understood that the data processing system 100 may include additional elements, such as those shown in FIG. 1.

Referring to FIG. 10, the controller 130 may include a host interface 132 and a processor 134. The processor 134 may include a maximum outstanding RTT value (MAX ORTTV) determining component 1002, an RTT training operation component 1004, and a buffer management component 1010.

The maximum outstanding RTT value determining component 1002 may set a maximum outstanding RTT value. The maximum outstanding RTT value determining component 1002 may perform an operation corresponding to step S702 of FIG. 7. The maximum outstanding RTT value determining component 1002 may provide the host interface 132 with information on a first maximum outstanding RTT value INFO_MAX_DEVICE, which is the maximum outstanding RTT value that may be set based on the memory system 110. The host 102 may provide the host interface 132 with information INFO_MAX_HOST on a second maximum outstanding RTT value, which is the maximum outstanding value that may be set based on the host 102. The first maximum outstanding RTT value may be greater than or equal to the second maximum outstanding RTT value. The maximum outstanding RTT value determining component 1002 may set the second maximum outstanding RTT value as the maximum outstanding RTT value. The maximum outstanding RTT value determining component 1002 may provide the RTT training operation component 1004 with information INFO_MAX_RTT on the maximum outstanding RTT value.

The RTT training operation component 1004 may perform a training operation of detecting the optimal outstanding RTT value based on the information INFO_MAX_RTT on the provided maximum outstanding RTT value. The RTT training operation component 1004 may perform an operation corresponding to step S704 of FIG. 7. The RTT training operation component 1004 may perform a transaction operation with the host 102 while sequentially changing the outstanding RTT value in the range from the minimum outstanding RTT value to the maximum outstanding RTT value. The RTT training operation component 1004 may provide the host interface 132 with information INFO_OPTIMAL on the optimal outstanding RTT value which is detected according to the training operation.

The buffer management component 1010 may compare the size SIZE_WB of the memory 144 with the size SIZE_CMD of the program data, which is included in the program command. When the size SIZE_WB of the memory 144 is less than the size SIZE_CMD, the RTT training operation component 1004 may not perform a training operation until the sufficient space of the memory 144 is secured.

The host interface 132 may perform a transaction operation with the host 102 based on the information INFO_OPTIMAL on the optimal outstanding RTT value. The host interface 132 may set the outstanding RTT value as the optimal outstanding RTT value in response to the program command provided from the host 102 and then output an RTT signal and receive program data. Also, the host interface 132 may transfer information INFO_MAX_DEVICE on the first maximum outstanding RTT value to the host 102. Further, the host interface 132 may transfer the information INFO_MAX_HOST on the second maximum outstanding RTT value to the maximum outstanding RTT value determining component 1002.

Figure 11:
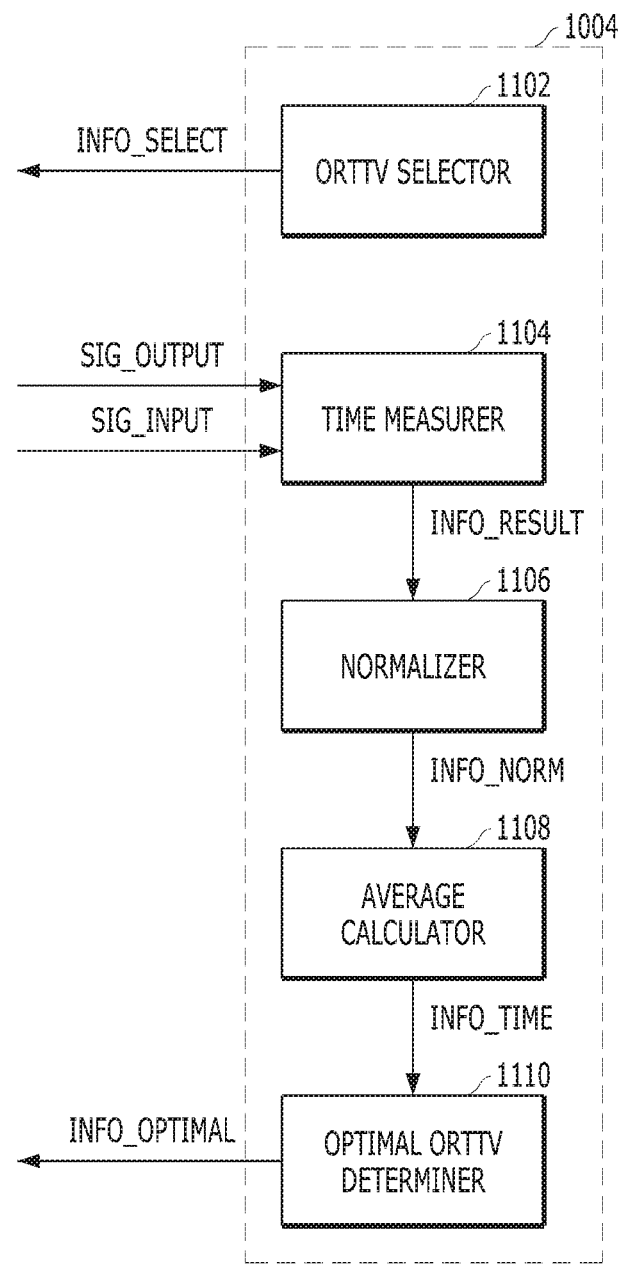
FIG. 11 is a block diagram illustrating a detailed structure of an RTT training operation component.

FIG. 11 is a block diagram illustrating a detailed structure of an RTT training operation component, such as that shown in FIG. 10.

Referring to FIG. 11, the RTT training operation component 1004 may include an outstanding RTT value (ORTTV) selector 1102, a time measurer 1104, a normalizer 1106, an average calculator 1108, and an optimal outstanding RTT value (OPTIMAL ORTTV) determiner 1110.

The outstanding RTT value selector 1102 may set the outstanding RTT value as the minimum outstanding RTT value MIN_ORTTV. The minimum outstanding RTT value may be '1' or '2'. When the training operation for the minimum outstanding RTT value is completed, the outstanding RTT value selector 1102 may sequentially increase the outstanding RTT value to select the maximum outstanding RTT value MAX_ORTTV. The outstanding RTT value selector 1102 may provide the host interface 132 with information INFO_SELECT on the selected outstanding RTT value.

The time measurer 1104 may obtain the times TIME_RTT_n from when each RTT signal as corresponding to the selected outstanding RTT value is provided to the host 102 to when the program data for the corresponding RTT signal is received. For example, when the outstanding RTT value (i) is '2', the time measurer 1104 may obtain the time from when a first RTT signal is outputted to when first data corresponding to the first RTT signal is received as a first required time TIME_RTT_1, and obtain the time from when a second RTT signal is outputted to when second data corresponding to the second RTT signal is received as a second required time TIME_RTT_2. The time measurer 1104 may provide the normalizer 1106 with information INFO_RESULT on the measured time.

The normalizer 1106 may normalize the time TIME_RTT_n required for receiving the program data for each of the RTT signals. Since the size of the requested data included in each of the RTT signals may be different, the size of data provided from the host 102 may be different as well. Therefore, in order to calculate the time required for transferring the data of the same size, the slave may normalize the required time as shown in Equation 1.

The normalizer 1106 may calculate a normalized required time TIME_NORMALIZE_n. The normalized required time TIME_NORMALIZE_n may be calculated by multiplying the time TIME_RTT_n by a value, which is calculated by dividing the size to be normalized SIZE_NORMALIZE by the requested data size DTC_n. The time TIME_RTT_n may be the period from when an RTT signal is supplied to the host 102 to when the program data for the RTT signal is received. The requested data size DTC_n may be included in the RTT signal. For example, when the requested data size DTC_n is approximately 16 KB and the size to be normalized SIZE_NORMALIZE is approximately 4 KB, the normalizer 1106 may obtain the normalized required time TIME_NORMALIZE_n by dividing the measured time TIME_RTT_n by 16 and then multiplying the result value by 4. The normalizer 1106 may provide the average value calculator 1108 with information INFO_NORM on the normalized time.

The average value calculator 1108 may calculate an average value of the normalized required times TIME_NORMALIZE_n. The average value calculator 1108 may calculate the average value by dividing the sum of the normalized required times TIME_NORMALIZE_n by the outstanding RTT value ORTTV, as shown in Equation 2. Since the number of times that program data are outputted from the host 102 may differ according to the outstanding RTT value ORTTV, it is possible to calculate the time required until the slave receives the program data corresponding to a unit RTT signal by calculating the average value.

The average value calculator 1108 may calculate an average value TIME_AVERAGE by dividing the sum of the normalized required times by the outstanding RTT value ORTTV. For example, when the outstanding RTT value ORTTV is '2', the average value calculator 1108 may calculate the average value TIME_AVERAGE by summing a first required time and a second required time, and dividing the sum by '2', which is the outstanding RTT value ORTTV. The first required time may be obtained by normalizing the time from when the first RTT signal is outputted to when the first data is received. The second required time may be obtained by normalizing the time from when the second RTT signal is outputted to when the second data is received. The average value calculator 1108 may provide the optimal outstanding RTT value determiner 1110 with information INFO_TIME about the average value.

The optimal outstanding RTT value determiner 1110 may detect the outstanding RTT value corresponding to the minimum value among the times required for a transaction operation performed based on the different outstanding RTT values as the optimal outstanding RTT value. To be specific, the optimal outstanding RTT value determiner 1110 may compare the average values. Each of the average values is obtained with respect to each of the different outstanding RTT values. Further, the optimal outstanding RTT value determiner 1110 may detect an outstanding RTT value having the minimum value as the optimal outstanding RTT value OPTIMAL_ORTTV. The optimal outstanding RTT value determiner 1110 may provide the host interface 132 with information INFO_OPTIMAL on the optimal outstanding RTT value.

According to embodiments of the present invention, the controller may detect an optimal outstanding RTT value according to the performance of the host by performing a training operation with the host. The controller may improve program performance by controlling a program operation of a memory device based on the optimal outstanding RTT value.

While the present invention has been illustrated and described with respect to specific embodiments, it will be apparent to those skilled in the art in light of the present disclosure that various changes and modifications may be made without departing from the spirit and scope of the invention as defined in the following claims.

What is claimed is:

1. A controller comprising:
    a host interface configured to provide a host with reception ready signals corresponding to a threshold value in response to a program command provided from the host; and
    a processor configured to perform a training operation to determine an optimal value for the threshold value,
    wherein the processor comprises:
    an outstanding ready-to-transfer (RTT) value selector configured to select one value in a range from a minimum value to a maximum value as the threshold value;
    a time measurer configured to provide the host with the reception ready signals that are selected corresponding to the threshold value and measure a reception time of data corresponding to each of the selected reception ready signals;
    a normalizer configured to normalize the reception times to generate normalized times that are measured for values ranging from the minimum value to the maximum value; and
    an optimal outstanding RTT value determiner configured to determine the threshold value corresponding to a minimum normalization time among the normalized times as the optimal value.

2. The controller of claim 1, further comprising:
    a memory configured to temporarily store data corresponding to the program command.

3. The controller of claim 2, wherein the processor includes:
    a maximum outstanding RTT value determining component configured to determine the maximum value based on external information; and
    a buffer management component configured to perform control to output the reception ready signals when a remaining space of the memory is greater than a size of the data corresponding to the program command.

4. The controller of claim 1, wherein the outstanding RTT value selector changes the threshold value from the minimum value to the maximum value.

5. The controller of claim 1, wherein the time measurer measures a time from when each of the reception ready signals is outputted to when data corresponding to that reception ready signal is received.

6. The controller of claim 1, wherein the normalizer multiplies a normalized size by a value which is obtained by dividing a time measured for each of the reception ready signals by a data size corresponding to each of the reception ready signals.

7. The controller of claim 6, wherein the normalizer divides a value obtained by summing all the normalized times for the respective reception ready signals by the selected threshold value.

8. The controller of claim 1, wherein the processor generates the reception ready signals in response to a single command.

9. The controller of claim 1, wherein the time measurer measures a time from when reception of external data begins to when the reception of the external data is completed.

10. A method for operating a controller, comprising:
    outputting reception ready signals corresponding to a threshold value in response to a program command provided from a host; and
    performing a training operation to determine an optimal value for the threshold value,
    wherein the performing of the training operation comprises:
    selecting one value in a range from a minimum value to a maximum value as the threshold value;
    measuring a reception time of data corresponding to each of the reception ready signals;
    normalizing the reception times to generate normalization times that are measured for values ranging from the minimum value to the maximum value; and
    determining the threshold value corresponding to a minimum normalization time among the normalization times as the optimal value.

11. The method of claim 10, further comprising:
    temporarily storing data corresponding to the program command in a memory.

12. The method of claim 11, wherein the performing of the training operation includes:
    determining the maximum value based on external information; and
    outputting the reception ready signal when a remaining space of the memory is greater than a size of the data corresponding to the program command.

13. The method of claim 10, wherein the selecting of one value in the range from the minimum value to the maximum value as the threshold value comprises
    changing the threshold value from the minimum value to the maximum value.

14. The method of claim 10, wherein the measuring of the reception times of the data corresponding to the reception ready signals comprises
    measuring a time from when each of the reception ready signals is outputted to when the data corresponding to that reception ready signals is received.

15. The method of claim 10, wherein the normalizing of the reception time comprises
    multiplying a normalized size by a value obtained by dividing a time measured for each of the reception ready signals by a data size corresponding to each of the reception ready signals.

16. The method of claim 15, wherein the normalizing of the reception time comprises
    dividing a value obtained by summing all the normalized times for the respective reception ready signals
    by the selected threshold value.

17. The method of claim 10, further comprising:
    generating the reception ready signals in response to a single command.

18. The method of claim 10, wherein the measuring of the reception times of the data comprises measuring a time from when reception of external data begins to when the reception of the external data is completed.

19. The method of claim 10, wherein the minimum value is a predetermined value.

* * * * *